(12) United States Patent  
Huang et al.

(10) Patent No.: US 8,052,109 B2  
(45) Date of Patent: Nov. 8, 2011

(54) COOLING STAND

(75) Inventors: Chiu-Mao Huang, Sinjhuang (TW); Tzu-Chun Hsueh, Sinjhuang (TW); Hung-Chin Liao, Sinjhuang (TW)

(73) Assignee: Asia Vital Components Co., Ltd., Taipei County (TW)

( * ) Notice: Subject to any disclaimer, the term of this patent is extended or adjusted under 35 U.S.C. 154(b) by 303 days.

(21) Appl. No.: 12/365,306

(22) Filed: Feb. 4, 2009

(65) Prior Publication Data

US 2010/0193157 A1     Aug. 5, 2010

(51) Int. Cl.
*A47B 91/00* (2006.01)
*A47G 29/00* (2006.01)
*B65D 19/00* (2006.01)

(52) U.S. Cl. ................ 248/346.01; 248/176.2; 248/917; 361/687

(58) Field of Classification Search ............. 248/346.01, 248/346.03, 917–923, 176.2
See application file for complete search history.

(56) References Cited

U.S. PATENT DOCUMENTS

| | | | |
|---|---|---|---|
| 4,618,119 A * | 10/1986 | Powell | 248/456 |
| 5,768,101 A | 6/1998 | Cheng | |
| 6,239,971 B1 | 5/2001 | Yu et al. | |
| 6,256,193 B1 | 7/2001 | Janik et al. | 361/679.59 |
| 6,814,009 B2 | 11/2004 | Acevedo et al. | 108/50.02 |
| 7,607,915 B2 | 10/2009 | Adair et al. | 431/292 |

* cited by examiner

*Primary Examiner* — Amy J Sterling

(57) ABSTRACT

A cooling stand includes a base and a top plate made of a crystal glass material. At least one support member is provided on an upper face of the base for supporting the top plate above the base. One face of the top plate facing away from the base is an inclined supporting face, and the top plate and the base together define a rearward expanded space between them. A heat-producing article can be positioned on the inclined supporting face of the top plate, allowing a user to operate the heat-producing article in a position meeting the ergonomics. Meanwhile, heat produced by the heat-producing article can be highly efficiently absorbed by and then dissipated from the crystal glass material of the top plate through air convection at the rearward expanded space.

4 Claims, 4 Drawing Sheets

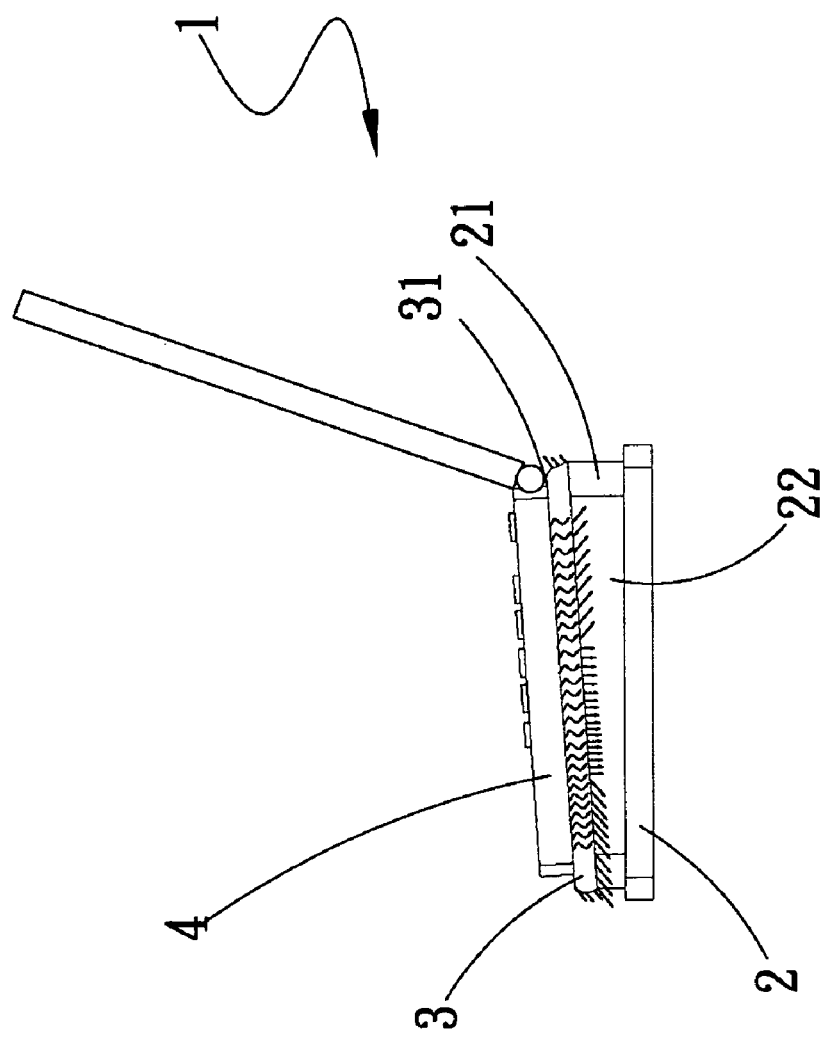

COOLING STAND

FIELD OF THE INVENTION

The present invention relates to a Cooling stand, and more particularly to a cooling stand made of a crystal glass material to enable quick heat absorption and quick dissipation of the absorbed heat.

BACKGROUND OF THE INVENTION

Following the rapid development in the electronic and information industrial fields, all kinds of 3C (communication, computer, and consumer electronics) products have been more widely adopted among users and applied to various fields. It is a trend in the electronic and information industries to develop 3C products with further increased computing and processing speed and expanded access capacity. However, the electronic components in the 3C products operating at high speed would also produce a large amount of heat during the operation thereof.

For example, among others, the central processing unit (CPU) of a notebook computer produces the largest part of heat in the computer. When the heat produced by the CPU and accumulated in the computer exceeds an allowable limit, the computer is subject to the danger of shutdown or even becoming seriously damaged. Moreover, to solve the problem of electromagnetic radiation, a case is usually used to enclose all the important computer components and elements therein. Therefore, it is a very important matter to quickly dissipate the heat produced by the CPU and other heat-producing elements in the computer case.

The large amount of heat produced by the CPU would also lead to rise of ambient temperature. Normally, a cooling fan will be mounted to the CPU to help in dissipating the heat produced by the CPU, so as to keep the CPU at a proper working temperature. However, for the notebook computer that has a relatively tightly sealed internal space, the cooling fan mounted therein usually fails to effectively introduce external cold air into the computer case to force out the heat produced by the CPU through forced convection. As a result, the notebook computer usually has low heat dissipation efficiency.

Some users would position a notebook computer on a cooling stand, so that an increased distance exists between the notebook computer and a desk top to provide a convection space, which is helpful in enhancing the heat dissipation efficiency of the notebook computer. However, in general, a conventional cooling stand can only increase the distance between the notebook and the desk top, so that the heat produced by the CPU is dissipated via a heat dissipation hole formed on a bottom of the notebook computer. That is, the conventional cooling stand itself does not absorb the heat produced by the CPU and therefore does not provide the notebook computer with good heat dissipation effect.

In brief, the conventional cooling stand has the following drawbacks: (1) It does not absorb the heat produced by the CPU; and (2) the heat dissipation effect that can be achieved via the conventional cooling stand is low.

It is therefore tried by the inventor to develop an improved cooling stand that can overcome the drawbacks of the conventional cooling stand to provide enhanced heat dissipation effect.

SUMMARY OF THE INVENTION

A primary object of the present invention is to provide a cooling stand having a top plate made of a crystal glass material, so that heat produced by a heat-producing article positioned on the top plate can be quickly absorbed by and then dissipated from the top plate of the cooling stand.

Another object of the present invention is to provide a cooling stand having a top plate with an inclined supporting face, so that a heat-producing article positioned thereon can be operated by a user in a position meeting the ergonomics.

A further object of the present invention is to provide a cooling stand having a top plate and a base to define a rearward expanded space between them, so that heat produced by a heat-producing article positioned on the cooling stand and dissipated into the rearward expanded space can be quickly carried away from the cooling stand by surrounding cold air through air convection.

To achieve the above and other objects, the cooling stand according to the present invention includes a base and a top plate made of a crystal glass material. At least one support member is provided on an upper face of the base for supporting the top plate above the base. One face of the top plate facing away from the base is an inclined supporting face, and the top plate and the base together define a rearward expanded space between them. A heat-producing article can be positioned on the inclined supporting face of the top plate, and heat produced by the heat-producing article can be highly efficiently absorbed by and then dissipated from the crystal glass material of the top plate into ambient air through air convection at the rearward expanded space. According to the aforesaid, the cooling stand of the present invention is advantageous for use due to the following reasons: (1) the top plate of the cooling stand is able to absorb and dissipate the heat produced by the heat-producing article positioned thereon; (2) the cooling stand provides good heat dissipation effect; (3) the heat-producing article positioned on the cooling stand can be operated by a user in a manner meeting the ergonomics; and (4) the rearward expanded space between the base and the top plate enables good air convection thereat to achieve the purpose of heat dissipation.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein:

FIG. 4 is a side view of FIG. 3 showing the manner in which heat produced by the notebook computer is dissipated from the cooling stand of the present invention.

DETAILED DESCRIPTION OF THE PREFERRED EMBODIMENTS

Figure 1:
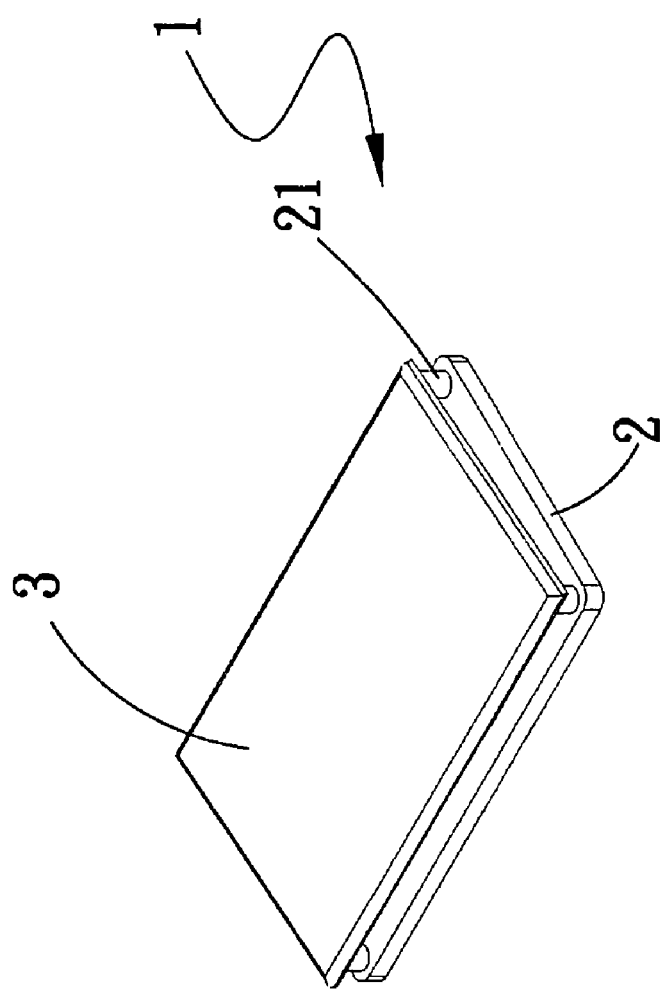
FIG. 1 is a perspective view of a cooling stand according to a preferred embodiment of the present invention.
Figure 2:
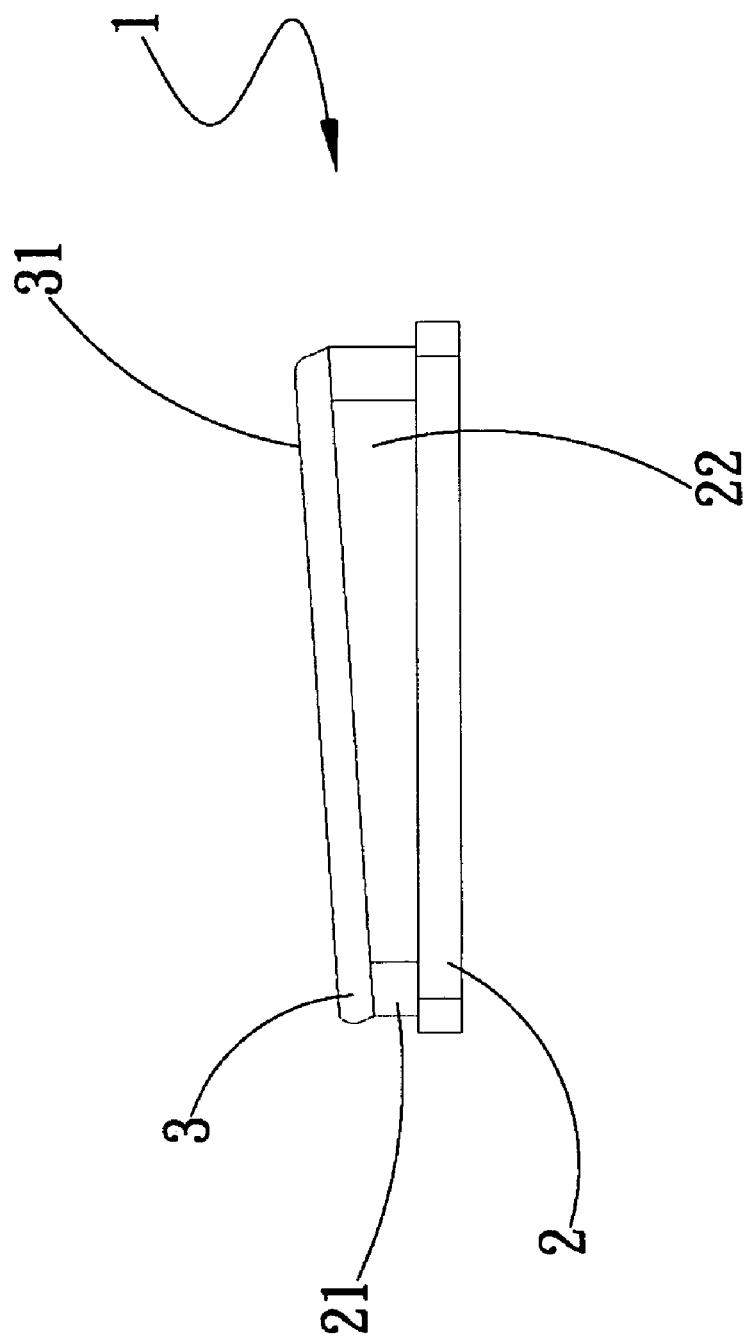
FIG. 2 is a side view of FIG. 1.

Please refer to FIGS. 1 and 2 that are perspective and side views, respectively, of a cooling stand 1 according to a preferred embodiment of the present invention. As shown, the cooling stand 1 includes a base 2 and a top plate 3. The base 2 has a planar lower face. At least one support member 21 is provided on an upper face of the base 2, and the top plate 3 is supported on the support member 21 to locate above the base 2. The top plate 3 is made of a crystal glass material, which is able to absorb heat and then dissipate the absorbed heat therefrom. Where there are two or more support members 21 provided on the upper face of the base 2, the support members 21 located near a front edge of the base 2 have a height smaller than that of the support members 21 near a rear edge of the base 2, so that the top plate 3 supported on the support members 21 is inclined forward to provide an inclined supporting face 31, and a rearward expanded space 22 is formed between the top plate 3 and the base 2.

Figure 3:
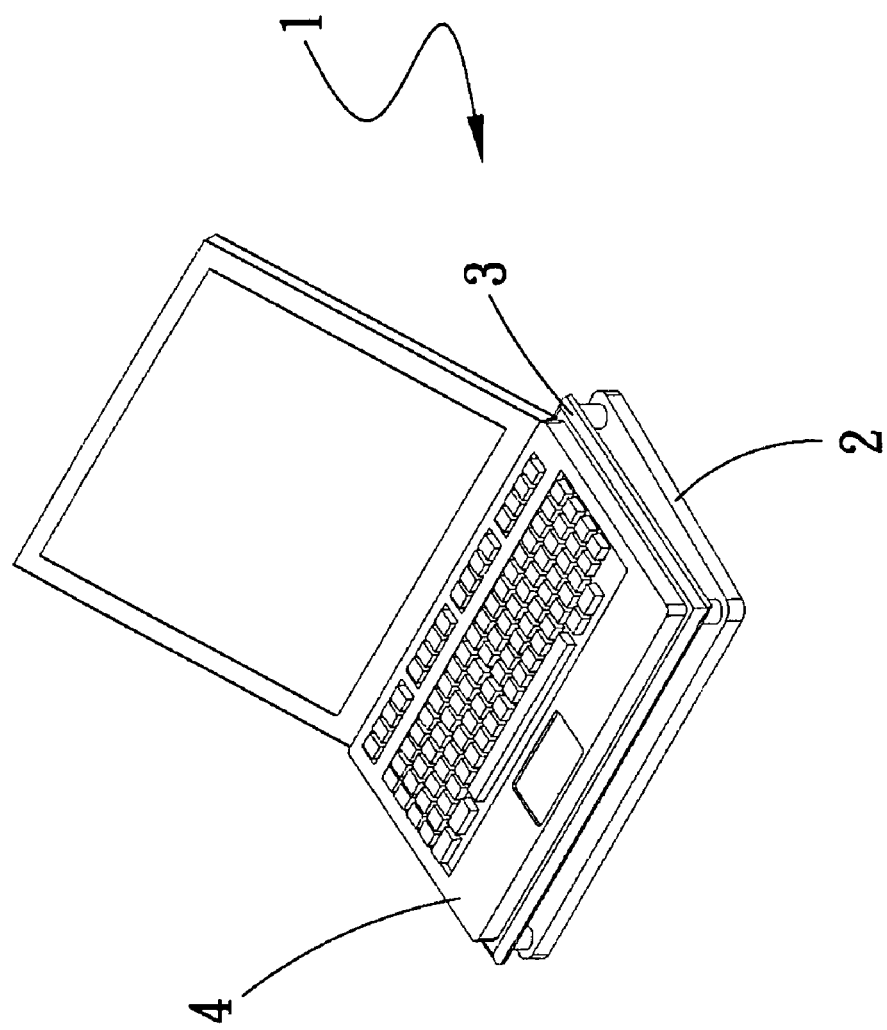
FIG. 3 is a perspective view showing the use of the cooling stand of the present invention to support a notebook computer thereon.

Please now refer to FIGS. 3 and 4 at the same time. The base 2 can be placed on a planar surface with a heat-producing article 4, such as an electronic device, positioned on the inclined supporting face 31 of the top plate 3. Due to the inclined supporting face 31, the heat-producing article 4 positioned thereon is also presented before a user at an inclination, allowing the user to operate the heat-producing article 4 on the top plate 3 in a more comfortable manner that meets ergonomics. With the heat-producing article 4 flatly bearing on the top plate 3 made of a crystal glass material, heat produced by the heat-producing article 4 during the operation thereof can be absorbed by the top plate 3. The heat absorbed by the top plate 3 will then dissipate from the top plate 3 into the rearward expanded space 22 between the top plate 3 and the base 2. With the rearward expanded space 22, the heat dissipated thereinto can be easily pushed out of the cooling stand 1 into ambient environment by surrounding cold air through air convection. In brief, heat produced by the heat-producing article 4 can be highly efficiently absorbed by and dissipated from the cooling stand 1.

An anti-slip member (not shown) can be additionally provided on the inclined supporting face 31 of the top plate 3. When the heat-producing article 4 is positioned on the top plate 3, the anti-slip member serves to prevent the heat-producing article 4 from slipping down from the inclined top plate 3. Alternatively, a stop member can be provided on a lower edge of the inclined supporting face 31 to prevent the heat-producing article 4 from slipping down from the top plate 3.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A cooling stand, comprising:
    a base having a plurality of support members provided near a front edge of the base and near a rear edge of the base, on an upper face thereof, the support members located near the front edge of the base having a height smaller than that of the support members located near the rear edge of the base; and
    a top plate made of a crystal glass material located above the base and spaced therefrom, the top plate being supported at a fixed angle therewith on the plurality of support members; one face of the top plate facing away from the base providing a supporting face, on which at least one heat-producing article can be positioned, such that heat produced by the heat-producing article is absorbed by and then dissipated from the top plate into ambient environment.

2. The cooling stand as claimed in claim 1, wherein the supporting face of the top plate is an inclined supporting face.

3. The cooling stand as claimed in claim 1, wherein the top plate and the base together define a rearward expanded space between them.

4. The cooling stand as claimed in claim 1, wherein the heat-producing article is an electronic device.

* * * * *